(12) United States Patent
Oettinger et al.

(10) Patent No.: US 6,714,338 B2
(45) Date of Patent: Mar. 30, 2004

(54) MEM'S MIRROR INTERNAL SENSOR LINEARIZATION BASED ON DRIVER LINEARITY

(75) Inventors: Eric G. Oettinger, Rochester, MN (US); Mark D. Heminger, Rochester, MN (US); Mark D. Hagen, Rochester, MN (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 10/146,758

(22) Filed: May 16, 2002

(65) Prior Publication Data

US 2003/0214696 A1 Nov. 20, 2003

(51) Int. Cl.[7] .......................... G02B 26/00; G02B 26/08
(52) U.S. Cl. ........................................ 359/291; 359/223
(58) Field of Search ................................ 359/223, 290, 359/291, 298

(56) References Cited

U.S. PATENT DOCUMENTS

2002/0070335 A1 * 6/2002 Orcutt et al. ............... 250/234
2002/0075553 A1 * 6/2002 Orcutt ........................ 359/290
2003/0141439 A1 * 7/2003 Heminger et al. .......... 250/221

* cited by examiner

Primary Examiner—David N. Spector
(74) Attorney, Agent, or Firm—William B. Kempler; W. James Brady, III; Frederick J. Telecky, Jr.

(57) ABSTRACT

A technique that reduces or eliminates the non-linearities associated with the internal feedback sensor used in a micro-electro-mechanical mirror assembly. Using the relatively linear response of the mirror positioning motor, associated driver electronics, and the mirror itself, a calibration is performed that compensates for the internal feedback sensor non-linearity. An expected position can then be calculated simply by multiplying the gain of the system by the output, due to the good inherent linearity in the system. The calibration will compare measured versus expected position criteria for a predefined set of constant outputs. The data will form a look-up table that will be used to correct for the sensor non-linearities.

10 Claims, 1 Drawing Sheet

MEM'S MIRROR INTERNAL SENSOR LINEARIZATION BASED ON DRIVER LINEARITY

BACKGROUND OF THE INVENTION

1. Field of the Invention

This invention relates generally to a micro-electro-mechanical (MEM) mirror, and more particularly, to a method of linearizing the mirror's internal position sensor based on driver linearity.

2. Description of the Prior Art

A MEM mirror consists of a small reflective surface with a means for adjusting the angle of the reflective surface relative to the fixed base in which it is mounted. In this system the means for detecting the angle of rotation may be located in close proximity to the mirror itself, possibly contained within the package holding the mirror. It may be implemented for instance using four light emitting diodes (LEDs) surrounding a photo-detector located behind the mirror. This mechanism for detecting rotational position is herein after referred to as the internal feedback sensor.

The internal feedback sensor used in a MEM mirror has inherent non-linearities. These non-linearities adversely affect the mirror movement control system. These non-linearities are especially troublesome when using feedback to move the mirror from one angular location to another (hereto referred to as seeks), because they change the gain in the middle of a mirror adjustment. Such non-linearities can also change the apparent gain when seen at different angles that affects the ability to hold the mirror substantially still (tracking) as well.

In view of the foregoing, it would be both desirable and advantageous in a micro-electro-mechanical (MEM) mirror assembly to provide a technique that reduces or eliminates the non-linearities associated with the internal feedback sensor.

SUMMARY OF THE INVENTION

The present invention is directed to a technique that reduces or eliminates the non-linearities associated with the internal feedback sensor used in a micro-electro-mechanical (MEM) mirror assembly. Using the relatively linear response of the mirror positioning motor, the associated driver electronics, and the mirror itself, a calibration is performed that compensates for the internal feedback sensor non-linearity. An expected position can then be calculated simply by multiplying the gain of the system by a given output, due to the good inherent linearity in the system. The calibration will compare measured versus expected position criteria for a predefined set of constant outputs. The data will form a look-up table that will be used to correct for the sensor non-linearities.

In one aspect of the invention, a technique that reduces or eliminates the non-linearities associated with the internal feedback sensor used in a micro-electro-mechanical (MEM) mirror assembly is implemented to provide faster settling times with less overshoot and stalls when performing seeks.

In another aspect of the invention, a technique that reduces or eliminates the non-linearities associated with the internal feedback sensor used in a micro-electro-mechanical (MEM) mirror assembly is implemented to enhance consistency associated with tracking performance.

In yet another aspect of the invention, a technique that reduces or eliminates the non-linearities associated with the internal feedback sensor used in a micro-electro-mechanical (MEM) mirror assembly is implemented in a manner that does not rely on external hardware to perform measurements.

According to one embodiment, a method of linearizing a micro-electro-mechanical (MEM) mirror position sensor comprises the steps of providing a MEM mirror, a mirror position sensor having a non-linear response, and a mirror position control system; tabulating mirror position sensor signals in response to a plurality of desired mirror positions; and adjusting a mirror position control system such that the tabulated mirror position sensor signals are adjusted to have a linear relationship to the plurality of desired mirror positions.

According to another embodiment, a method of linearizing a micro-electro-mechanical (MEM) mirror position sensor comprises the steps of providing a MEM mirror and a mirror position control loop having a non-linear mirror position sensor; tabulating non-linear mirror position sensor signals in response to a plurality of desired mirror positions; and adjusting the tabulated non-linear mirror position sensor signals such that the mirror position control loop provides a linear response to the non-linear mirror position sensor signals.

According to yet another embodiment, a micro-electro-mechanical (MEM) mirror positioning system comprises a MEM mirror; a non-linear mirror position sensor; and a controller configured to adjust output signals generated via the non-linear mirror position sensor such that the controller operates to provide a linear mirror position response to the output signals generated via the non-linear mirror position sensor.

BRIEF DESCRIPTION OF THE DRAWINGS

Other aspects, features and advantages of the present invention will be readily appreciated, as the invention becomes better understood by reference to the following detailed description when considered in connection with the accompanying drawing figures wherein.

While the above-identified drawing figures set forth particular embodiments, other embodiments of the present invention are also contemplated, as noted in the discussion. In all cases, this disclosure presents illustrated embodiments of the present invention by way of representation and not limitation. Numerous other modifications and embodiments can be devised by those skilled in the art which fall within the scope and spirit of the principles of this invention.

DETAILED DESCRIPTION OF THE PREFERRED EMBODIMENTS

Figure 1:
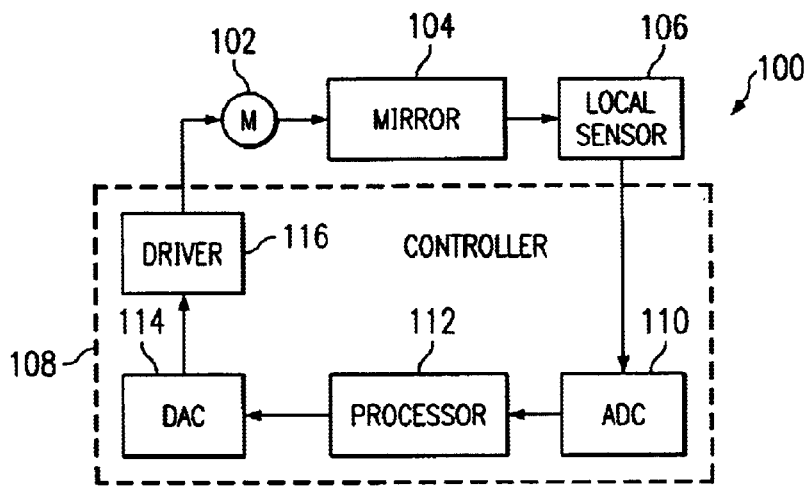
FIG. 1 is a system block diagram illustrating a MEM mirror system.

FIG. 1 is a system block diagram illustrating a micro-electro-mechanical (MEM) mirror system 100. MEM system 100 can be seen to have a MEM mirror assembly 104 including an internal (local) sensor 106, as well as a controller 108 that function generally as described in U.S. patent application Ser. No. 10/145,989, entitled Method Of Sampling Local And Remote Feedback In An Optical Wireless Link, docket number TI-33553, filed on May 14, 2002, by Oettinger et al., assigned to Texas Instruments Incorporated, the assignee of the present application, and that is hereby incorporated by reference in its entirety herein.

With continued reference now to FIG. 1, the MEM system 100 also can be seen to include a mirror positioning motor 102. Controller 108 includes an analog-to-digital converter (ADC) 110, and a data processor 112 that may be, for example, a digital signal processor (DSP), a microcontroller, a CPU, a computer, a micro-computer, or other like data processing device. Controller 108 also includes a digital-to-analog converter (DAC) 114 and a motor driver 116.

Figure 2:
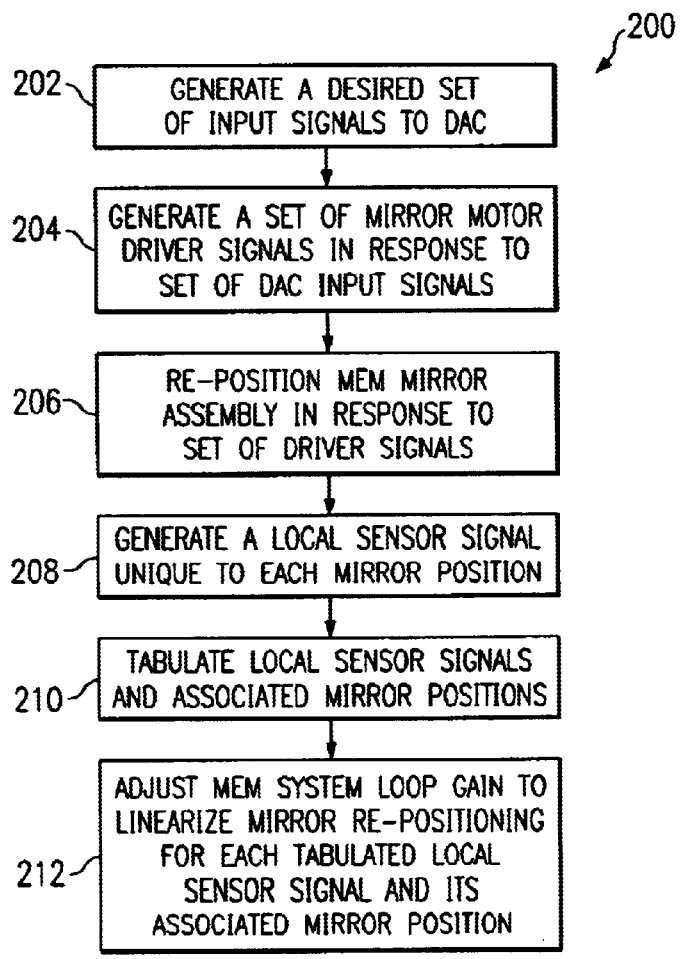
FIG. 2 is a flow chart depicting a method of linearizing the MEM internal sensor shown in FIG. 1, according to one embodiment of the present invention.

FIG. 2 is a flow chart depicting a method 200 of linearizing the MEM mirror internal feedback sensor 106 shown in FIG. 1, according to one embodiment of the present invention. The internal feedback sensor 106 has inherent non-linearities, as stated herein before. These non-linearities adversely affect the MEM system 100. As also stated herein before, these non-linearities are especially troublesome when using feedback to perform seeks, because they change the gain in the middle of a mirror movement. They can also change the apparent gain seen at different mirror 204 angles, which affects the tracking performance as well.

Method 200 is then directed to a technique of calibrating the MEM system 100 to compensate for the non-linearity associated with the internal feedback sensor 106. The present inventors specifically recognized that the relatively linear response of the mirror positioning motor 102 and controller 108 electronics could be used to perform a calibration procedure in a manner that compensates for the sensor 106 non-linearity. They also recognized that because of the good linearity in the rest of the system 100, an expected ADC 110 output representing the mirror 104 position could, for example, be calculated simply by multiplying the gain of the MEM system 100 by the DAC 114 input if the sensor was linearized.

Method 200 shall be understood to apply to a wide variety of internal sensor types. Those skilled in the light sensor art will already be aware of a vast array of position sensors and methods of implementing position sensors; and so detailed descriptions relating to the internal feedback sensor 106 are not set forth herein to preserve brevity and clarity in describing the preferred embodiments.

With continued reference now to FIG. 2, a calibration procedure 200 according to one embodiment of the present invention looks at "counts" rather than current or voltage i.e. the values in abstract units of "counts" that the processor 112 writes to the DAC 114, and reads from the ADC 110. The calibration procedure 200 functions to map the non-linearities of the local sensor 106.

Because the rest of the MEM system 100 is linear, it is easy to see that some fixed gain is associated with the DAC 114, while another fixed gain is associated with the driver 116 that together will cause the mirror 104 to move proportionally to the output of the driver 116 in response to a desired value (e.g. 1,000) that is written to the DAC 114. The mirror 104 may, for example, move 20 milli-radians in response to the 1000 counts that are written to the DAC 114. Because the rest of the MEM system 100 is linear, writing a value of 2,000 counts to the DAC 114 will then cause the mirror 104 to move 40 milli-radians; 3,000 counts to the DAC 114 will cause the mirror 104 to move 60 milli-radians, etc.

If the local sensor 106 was ideal (having a fixed gain), the foregoing 20 milli-radian motion of the mirror 104 would cause the fixed gain through the ADC 110 to generate a count value that could then be further scaled (via another gain) to generate exactly the desired 1,000 count value (1,000 counts to the DAC 114 would provide 1,000 counts from the ADC 210). This fixed ratio (1 to 1) would then be valid, regardless of input value, in a completely linear system.

The present inventors have found, however, that in a real MEM system, the local sensor 106 is not in fact ideal. When the mirror 104 moves 20 milli-radians, a relative count reading might be, for example, 1,000; but when the mirror 104 moves 40 milli-radians, the resultant count reading is not the desired 2,000, but instead is some other undesired count value, i.e. 1,500, delivering less than optimal performance in the MEM system 100 control loop. The MEM system 100 must then be compensated in some manner to achieve optimal performance in the control loop.

Looking again at FIG. 2, calibration procedure 200 operates to create a table of measured ADC 110 inputs for a fixed set of DAC 114 outputs as shown in blocks 202–210. Specifically, processor 112 functions to deliver desired inputs to the DAC 114 as shown in block 202 such that the DAC 114 will generate a set of output signals to driver 116 as shown in block 204. Driver 116 will then activate the mirror motor 102 to reposition mirror 104 in response to each of the desired DAC 114 inputs as shown in block 206. The local sensor 106 will sense the re-positioning of the mirror 104 to generate a unique ADC 110 input signal (count) at each of the desired DAC 114 inputs as shown in block 208. Each of the unique ADC 110 input signals (counts) is then tabularized as shown in block 210. Finally, an algorithmic software is implemented to perform a lookup operation that corrects for the error in the pending measurement as seen in block 212. If, for example, a measured ADC 10 input count value during operation of an optical wireless link was found to be 1,500, and it was known by reference to the look-up table that the real count value should have been 2,000, then a correction is made to the DAC 114 input count prior to using the position value of 1,500 for any mirror 104 control operations.

In view of the above, it can be seen the present invention presents a significant advancement in the art of MEM mirror control techniques. Further, this invention has been described in considerable detail in order to provide those skilled in the optical wireless communication art with the information needed to apply the novel principles and to construct and use such specialized components as are required. In view of the foregoing descriptions, it should be apparent that the present invention represents a significant departure from the prior art in construction and operation. However, while particular embodiments of the present invention have been described herein in detail, it is to be understood that various alterations, modifications and substitutions can be made therein without departing in any way from the spirit and scope of the present invention, as defined in the claims which follow.

What is claimed is:

1. A method of linearizing a micro-electro-mechanical (MEM) mirror position sensor, the method comprising the steps of:

providing a MEM mirror, a mirror position sensor having a non-linear response, and a mirror position control system;

tabulating mirror position sensor signals in response to a plurality of desired mirror positions; and adjusting a mirror position control system gain such that the tabulated mirror position sensor signals are adjusted to have a linear relationship to the plurality of desired mirror positions.

2. The method according to claim 1 wherein the step of tabulating mirror position sensor signals in response to a plurality of desired mirror positions comprises the steps of:

generating a plurality of digital-to-analog converter (DAC) input signals and generating DAC output signals thereof;

generating mirror motor driver signals in response to the DAC output signals, such that a mirror motor re-positions the MEM mirror in response thereto;

generating a mirror position sensor output signal at each MEM mirror position; and generating a look-up table that indicates each MEM mirror position and each respective mirror position sensor output signal corresponding thereto.

3. The method according to claim 1 wherein the step of adjusting a mirror position control system gain such that the tabulated mirror position sensor signals are adjusted to have a linear relationship to the plurality of desired mirror positions comprises the steps of:

generating an analog-to-digital converter (ADC) output signal in response to each mirror position sensor signal; and processing the ADC output signals via a data processor to generate adjusted control loop signals thereof, such that the mirror position control system has a linear response to the tabulated mirror position sensor signals.

4. A method of linearizing a micro-electro-mechanical (MEM) mirror position sensor, the method comprising the steps of:

providing a MEM mirror and a mirror position control loop having a non-linear mirror position sensor;

tabulating non-linear mirror position sensor signals in response to a plurality of desired mirror positions; and adjusting the tabulated non-linear mirror position sensor signals such that the mirror position control loop provides a linear response to the non-linear mirror position sensor signals.

5. The method according to claim 4 wherein the step of tabulating non-linear mirror position sensor signals in response to a plurality of desired mirror positions comprises the steps of:

generating a plurality of digital-to-analog converter (DAC) input signals and generating DAC output signals thereof;

generating mirror motor driver signals in response to the DAC output signals, such that a mirror motor re-positions the MEM mirror in response thereto;

generating a mirror position sensor output signal at each MEM mirror position; and generating a look-up table that tabulates each MEM mirror position and each respective non-linear mirror position sensor output signal corresponding thereto.

6. The method according to claim 4 wherein the step of adjusting the tabulated non-linear mirror position sensor signals such that the mirror position control loop provides a linear response to the non-linear mirror position sensor signals, comprises the steps of:

generating an analog-to-digital converter (ADC) output signal in response to each mirror position sensor signal; and processing the ADC output signals via a data processor to generate adjusted control loop signals thereof, such that the control loop has a linear response to the tabulated non-linear mirror position sensor signals.

7. A micro-electro-mechanical (MEM) mirror positioning system comprising:

a MEM mirror;

a non-linear mirror position sensor; and a controller configured to adjust output signals generated via the non-linear mirror position sensor such that the controller operates to provide a linear mirror position response to the output signals generated via the non-linear mirror position sensor.

8. The MEM mirror positioning system according to claim 7, wherein the controller comprises:

an analog-to-digital converter (ADC) operational to generate output signals in response to the output signals generated via the non-linear mirror position sensor;

a data processor operational to generate adjusted output signals in response to the ADC output signals;

a digital-to-analog converter (DAC) operational to generate motor driver input signals in response to the adjusted output signals; and a motor driver operational to generate drive motor signals in response to the motor driver input signals.

9. The MEM mirror positioning system according to claim 8, further comprising a mirror drive motor operational to adjust the MEM mirror position in response to the drive motor signals such that the MEM mirror is caused to move in a linear fashion in response to the output signals generated via the non-linear mirror position sensor.

10. The MEM mirror positioning system according to claim 8, wherein the data processor comprises at least one device selected from the group consisting of a digital signal processor, a micro-controller, a CPU, a micro-computer, and a computer.

* * * * *